United States Patent [19]
Mahler et al.

[11] Patent Number: 4,844,530
[45] Date of Patent: Jul. 4, 1989

[54] SUN VISOR FOR MOUNTING ABOVE A SIDE WINDOW IN A VEHICLE

[75] Inventors: Gert Mahler, Radevormwald; Kurt Cziptschirsch, Wuppertal; Oltmann Oltmanns, Cologne, all of Fed. Rep. of Germany

[73] Assignee: Gebr. Happich GmbH, Fed. Rep. of Germany

[21] Appl. No.: 591,403

[22] Filed: Mar. 20, 1984

Related U.S. Application Data

[63] Continuation of Ser. No. 345,417, Feb. 3, 1982, abandoned.

[30] Foreign Application Priority Data

Feb. 18, 1981 [DE] Fed. Rep. of Germany ....... 3105848

[51] Int. Cl.⁴ ............................................... B60J 3/00
[52] U.S. Cl. .................... 296/97.1; 296/97.8; 160/DIG. 3
[58] Field of Search ................ 296/97 H, 97 R, 97 G, 296/97 J, 97 K, 140, 142, 143, 144; 160/DIG. 3

[56] References Cited

U.S. PATENT DOCUMENTS

| | | | |
|---|---|---|---|
| 2,101,901 | 12/1937 | Fletcher | 296/97 G |
| 2,254,647 | 9/1941 | Gallagher | 296/97 G X |
| 4,205,873 | 6/1980 | Viertel et al. | 160/DIG. 3 |
| 4,468,062 | 8/1984 | Marcus et al. | 296/97 G |
| 4,491,360 | 1/1985 | Fleming | 296/97 G |

FOREIGN PATENT DOCUMENTS

| | | | |
|---|---|---|---|
| 36659 | 9/1926 | Denmark | 296/97 G |
| 1382854 | 2/1964 | France | 296/97 G |

Primary Examiner—Russell D. Stormer
Attorney, Agent, or Firm—Ostrolenk, Faber, Gerb & Soffen

[57] ABSTRACT

The disclosure concerns various embodiments of a sun-visor for mounting at the front side window of an automotive vehicle. The sun-visor body is shifted up and down and may also be shifted laterally for covering the front side window of the vehicle, without swinging about a horizontal axis. Various mounting arrangements for the visor body are disclosed, including pivot links, pivotally attaching the visor body to the vehicle body; guide projections formed on one of the visor body and the vehicle body and a guide pathway for the guide projections being formed on the other; and tenons on the visor body which are received in respective guide tubes on the vehicle body. The guide pathway in the surface of the visor body for receiving a guide projection from the vehicle body, or vice-versa, may be obliquely inclined, arcuately curved or bent at an angle intermediate its length for defining both up and down and/or lateral motion of the visor body for covering the front side window.

27 Claims, 7 Drawing Sheets

4,844,530

SUN VISOR FOR MOUNTING ABOVE A SIDE WINDOW IN A VEHICLE

This is a continuation of application Ser. No. 345,417, filed, Feb. 3, 1982 now abandoned.

BACKGROUND OF THE INVENTION

The present invention relates to an arrangement for mounting a sun visor above a front side window in an automotive vehicle.

Ordinarily, sun visors are swingably mounted above the windshield of a vehicle in such a way that they can also be swung to the respective front side window. It is thus possible to suitably adjust the sun-visor, depending on whether the rays of the sun are coming from the front or from the side of the vehicle.

But, this known sun-visor arrangement is unfavorable in modern vehicles, particularly passenger cars, which have a relatively low structural height and frequently also provide only a very limited space for the passenger, so that the driver of the car is forced to move his head and crane his neck when he swings the sun-visor between the windshield and the side window. In addition, the roads frequently change their direction so that the rays of the sun arrive alternately from the front and from the side of the vehicle. The driver must continuously adjust the sun-visor or tolerate the glare of the sun if he simply leaves the sun-visor in the wrong position.

In view of the low height of modern cars, another known sun visor is not favorably arranged. This visor (see German Utility Model, Gebrauchsmuster No. 18 50 299) which includes two sun-visor bodies, which are swingably mounted on bars 90° apart from each other, in such manner that one sun-visor body can be swung down at one front side window while the other is swung down at the windshield. The same comment applies to a sun-visor arrangement in which the sun-visor body in front of the windshield is equipped with a wing which can be swung toward the side window (see, for instance, German Utility Model Gebrauchsmuster No. 77 06 998).

In another sun-visor arrangement (see, for instance, German Unexamined Application for Patent, OS No. 28 06 462), the sun-visor body in front of the windshield is equipped with an inserted tongue which can be pulled out towards the front side window and the body consists of a material with flexural elasticity. It is possible to pull out the additional sun-visor body or tongue only when the main sun-visor body is swung completely down which, however, is frequently unnecessary or undesired, depending upon the position of the sun.

Finally, it is also known to arrange ordinary sun-visor bodies on the front side windows of the car. These are mounted to be swingable around a horizontal axis. Upon the swinging of the sun-visor body, that longitudinal edge which is remote from the sun visor mount moves on an arcuate path relatively far into the passenger space of the vehicle, which is disadvantageous when little space is available.

SUMMARY OF THE INVENTION

In contrast to the prior art, the present invention provides a sun-visor arrangement for a front side window of a vehicle which avoids reducing the passenger space when the sun-visor body is moved between the positions of non-use and use. Furthermore, the invention provides screening even in the front corner region of the front side window which adjoins the windshield.

In accordance with the invention, the sun-visor body is oriented approximately parallel to the side window and is movable up and down inside the window while remaining in that parallel orientation. Guiding means are provided for guiding movement of the visor body up and down, without the visor body having to pivot out of its orientation generally parallel to the side window. The guiding means may also be adapted to permit lateral, and/or diagonal or oblique displacement of the visor body with respect to the side window, as needed to cover the front of the front side window. The guiding may cause the visor body to follow a bent guide path, partially down and up, and partially lateral, or may cause the visor body to follow an arcuate pathway, where the arc is curved to move the visor body down to the position for blocking sun from entering the front side window. The arrangement for supporting the sun-visor body is preferably at the rear side of the sun visor, so that the mechanism will not be visible inside the vehicle.

There are various techniques for guiding the sun-visor body. Some are now briefly mentioned. In one embodiment, an undercut guide groove may be defined either on the visor body or on the vehicle body while a slide projection is defined on the other of the visor body and the vehicle body to engage in the guide groove, and the guide groove and/or the projection are shaped and oriented for directing the visor body along the desired path of movement. In another embodiment, a pair of pivotal guide links connect the visor body and the vehicle body such that the pivoting of the links moves the visor body between its positions. The visor body and the links both pivot along an arcuate guide path. In yet another embodiment, a pair of tenons pass through appropriately oriented guide tubes. The tenons on the visor body support the visor body and guide it through through the appropriately oriented guide tubes.

A brake, or the like, for controlling movement of the visor body and appropriate end stop means at the end positions of the visor body are provided to keep the visor body at a desired position and to prevent its undesired extraction. Other features of the invention are described in detail below.

The arrangement in accordance with the invention provides substantial advantages. The sun-visor body can be moved between its non-use and its use positions without reducing the passenger space of the vehicle. This is advantageous in particular in vehicles of low total height and resultant slight head clearance for the users of the vehicle. The visor body position can be changed regardless of the positions of the sun-visor bodies in front of the windshield. Furthermore, it is no longer necessary for the sun-visor body to have cushioning properties since its edges are no longer swung into the interior of the vehicle. The mounting elements required for bringing the sun-visor body from one end position into the other end position, i.e. from storage to use, can be arranged on the rear of the sun-visor body, so that a pleasing appearance is also assured.

Because the front corner region of the side window is also to be capable of being screened off, although the side windows frequently have diagonally descending front edges, the sun-visor body may be mounted for movement also in the lateral direction. In this case, the sun-visor body should be shaped at one end to correspond to the diagonal direction of the window.

The invention will be explained in further detail below with reference to illustrative embodiments shown in the accompanying drawings.

BRIEF DESCRIPTION OF THE DRAWINGS

FIG. 5a shows a detail of FIG. 5.

DESCRIPTION OF THE PREFERRED EMBODIMENTS

Figure 1:
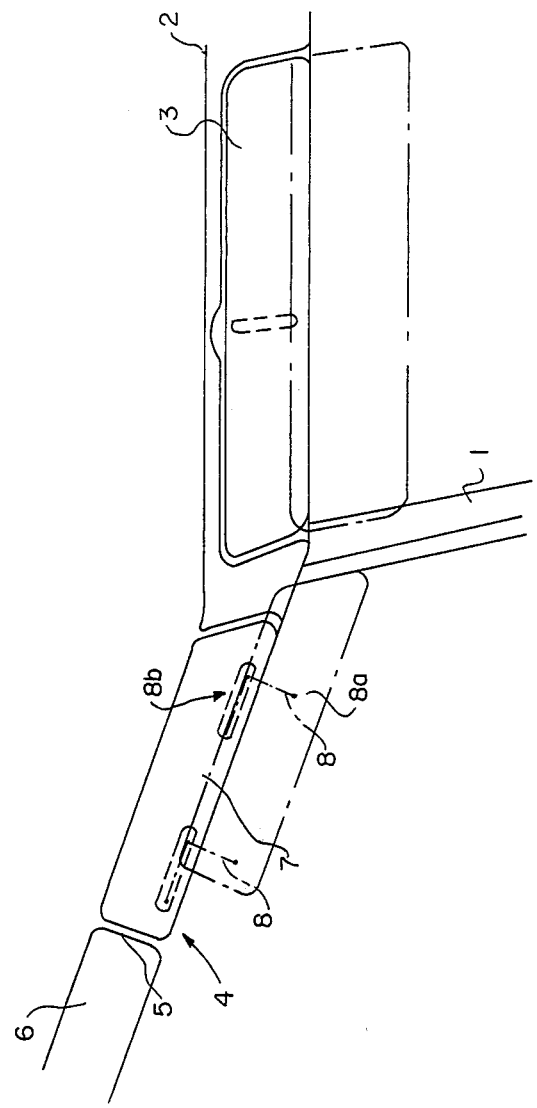
FIG. 1 shows a front, upper corner region of a vehicle in perspective, indicating the arrangement of sun visors on the windshield and on one side window.
Figure 3:
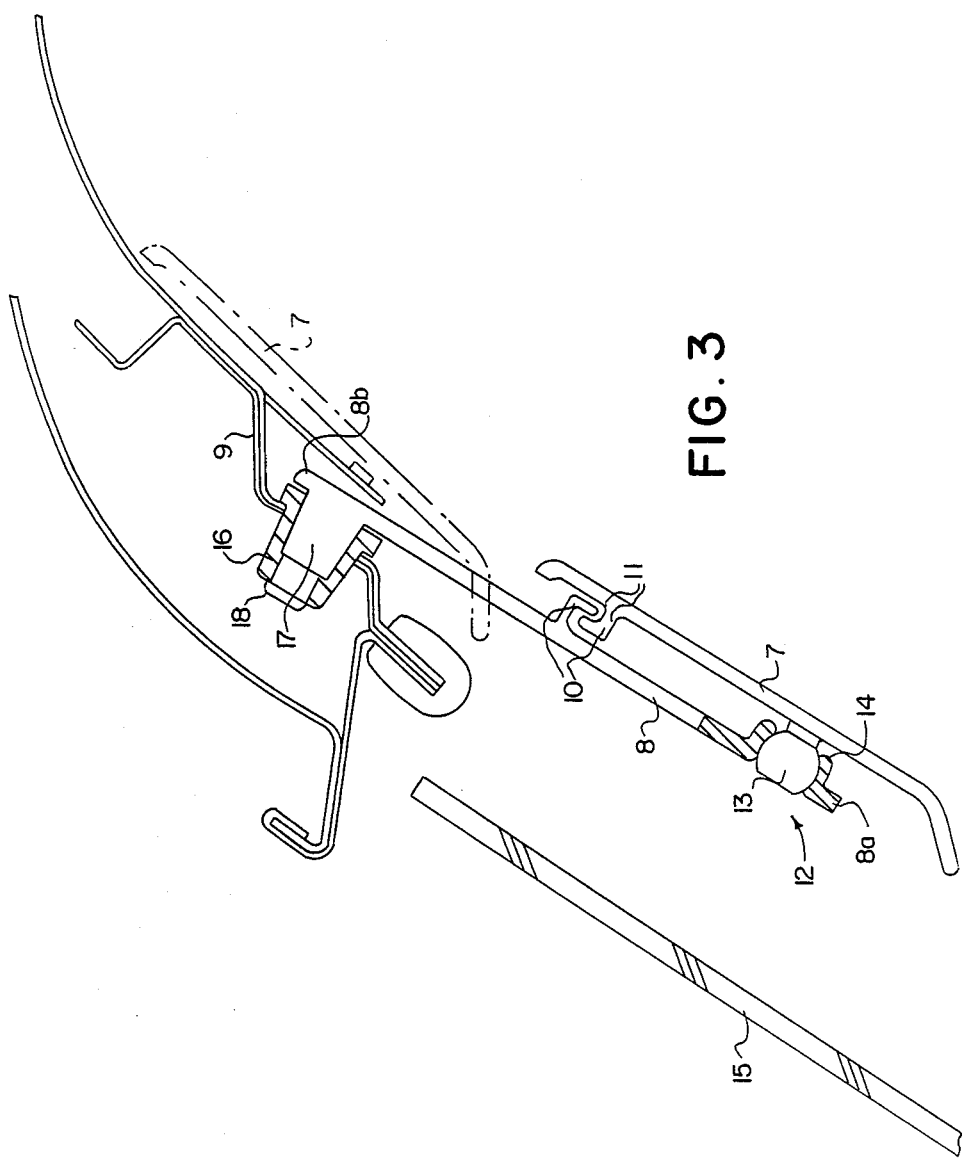
FIG. 3 is a side view of the sun-visor arrangement of FIG. 2, installed in a vehicle.

The portion of an automotive vehicle shown in FIG. 1 has a so-called A-column 1, which adjoins the windshield (not shown), which would be to the right in the drawing, and one of the front side windows 15 to the left (see FIG. 3). On the front roof frame and/or on the front roof-frame or ceiling covering 2, there is an ordinary sun visor 3, which in its position of use, shown by dash-dot lines, provides protection against glare from sun rays passing through the windshield from the front. The sun-visor 3 may be swingable around a horizontal axis in the customary manner or else may be mounted in translatable fashion in a manner described, for instance, in German Pat. No. 27 24 414.

Glare protection against sun rays entering the car from the side is provided by the side sun-visor 4 which is developed according to the invention. It includes sun-visor body 7, which is fitted in a recess 5 in the side roof-frame covering 6 and is brought down into the position of use, shown in dot-dash line.

In the embodiment shown in FIG. 1, the sun-visor body 7 is mounted for swinging on two guide links that extend parallel to each other and generally to the plane of the sun-visor body. One end 8a of the link is pivoted to the sun-visor body 7 and the other end 8b to the side of roof frame 9 respectively (see FIG. 3). As the guide links 8 are aligned generally parallel to the large side surfaces of the sun-visor body 7, the sun-visor body can be moved both up and down and in the directions toward and away from the A-column 1, which enables the visor body 7 to provide effective protection against glare. In order to secure the sun-visor body 7 against unintentional displacement, particularly in its end positions, but also in its intermediate positions, at least one pivot of one of the links 8 is provided with a friction device, not shown in detail.

Figure 2:
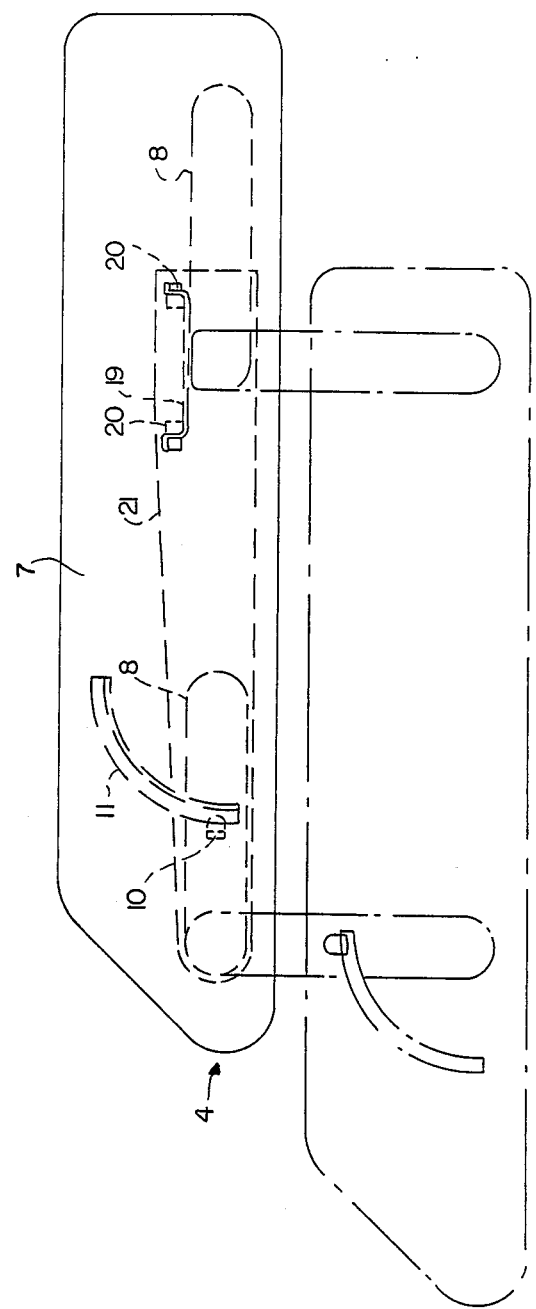
FIG. 2 diagrammatically shows a sun-visor arrangement for a vehicle side window, modified as compared with FIG. 1.

FIGS. 2 and 3 show a sun-visor arrangement which corresponds essentially to that shown in FIG. 1. The sun-visor body 7 is also mounted on the side roof frame 9 for swinging by two guide links 8 which are parallel to each other. In addition, on one of the links 8, there is a hook-shaped guide projection 10, which engages a guide path 11 formed on the sun-visor body 7. Seen in cross-section (FIG. 3), the guide path 11 has a hook-shaped developement directed oppositely to that of the guide projection 10.

Furthermore, in the embodiment of FIGS. 2 and 3 the pivot connections of the links 8 to the sun-visor body 7 each comprise a ball-and-socket joint 12, wherein the ball 13 is developed on the sun-visor body 7 and the socket 14 is developed on the link 8. The ball-and-socket joints 12 and the guidance formed by the parts 10, 11 automatically align the sun-visor body 7 with the plane of the side window 15 and the roof frame 9 or the roof-frame covering 6.

For the pivoting of each link 8 at its end 8b opposite the ball-and-socket joint 12, there is a bearing housing 16 which is fastened to the roof frame 9. A link 8 engages inside the bearing housing 16 via a pivot journal pin 17 attached or shaped on the visor body. The pivot journal pin 17 is secured by a mushroom head 18 against being pulled out of the bearing housing 16.

FIG. 2 shows a detent spring 19 that is provided on one of the bearing housings 16. The spring 19 is a leaf spring of U shape and it acts on the adjacent free end of one of the guide links 8. The lateral arms of the detent spring 19 engage in recesses 20 in the bearing housing 16. When it is not under load, the detent spring 19 lies on a longitudinal edge of the respective link 8, which occurs when the sun-visor body 7 is in the position of non-use. This secures the sun-visor body 7 in this non-use end position. When the sun-visor body 7 is brought into the position of use, the detent spring 19 is tensioned by the swinging of the associated free end of the link 8 and this end of the link then swings out so that upon movement of the sun-visor body 7, a corresponding frictional force must be overcome.

The bearing housings 16 are advisedly arranged on a base plate 21 or are developed integral with it. For instance, the bearing housings and base plate may be in the form of an injection molding of plastic. The base plate 21 has the receiving openings 20 for the detent spring 19. In this way, the entire sun-visor unit can be pre-assembled and in its pre-assembled condition, it can be arranged on the roof frame 9, particularly by plug-in installation, e.g. by attachment of the base plate.

Figure 4:
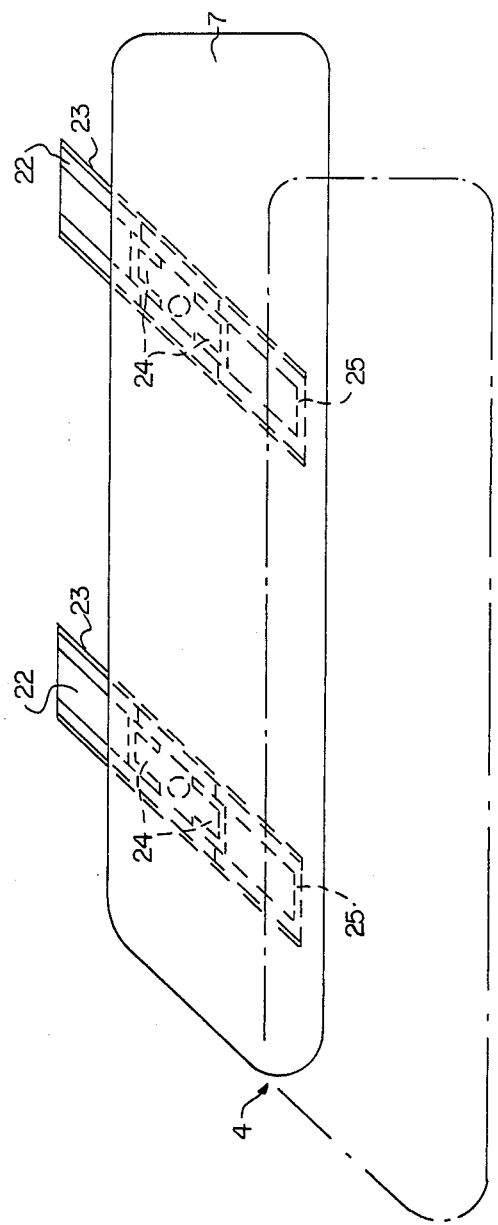
FIG. 4 is an elevational view of another embodiment of a sun-visor arrangement.
Figure 5:
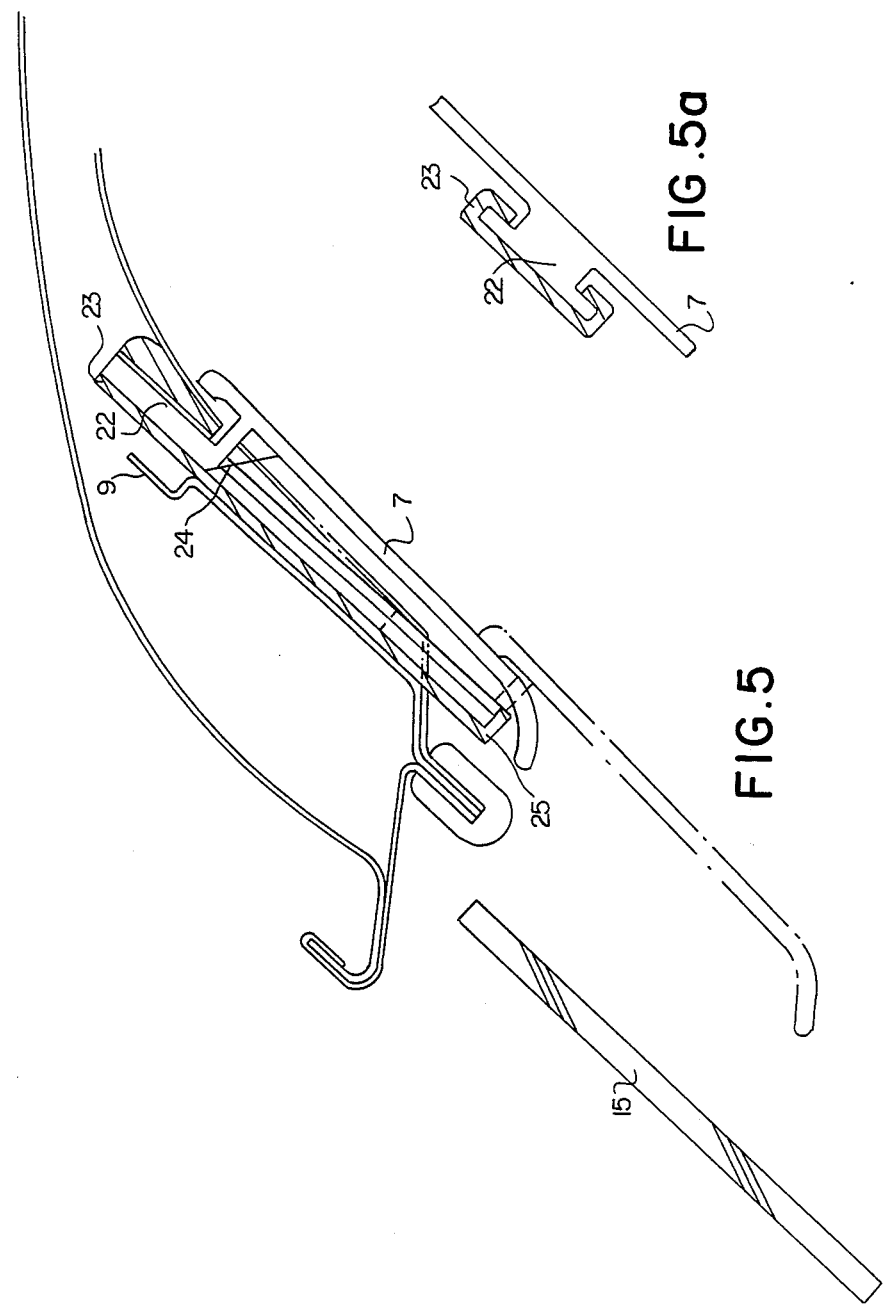
FIG. 5 is a side view of the arrangement of FIG. 4.

FIGS. 4, 5 and 5a show a relatively simple arrangement of a sun visor 4 on the side roof frame 9 of a vehicle. The sun-visor body 7 is mounted for displacmeent along an oblique path. The bearing elements are in the form of two slide projections 22 arranged on the sun-visor body 7. Two undercut guide rails 23 are arranged on the side roof frame 9, for guiding the sliding movement of the slide projections 22. Detent stops 24, which can be overridden, secure the sun-visor body 7 in its position of non-use, while end stops 25 limit the path of displacement into the position of use.

Figure 6:
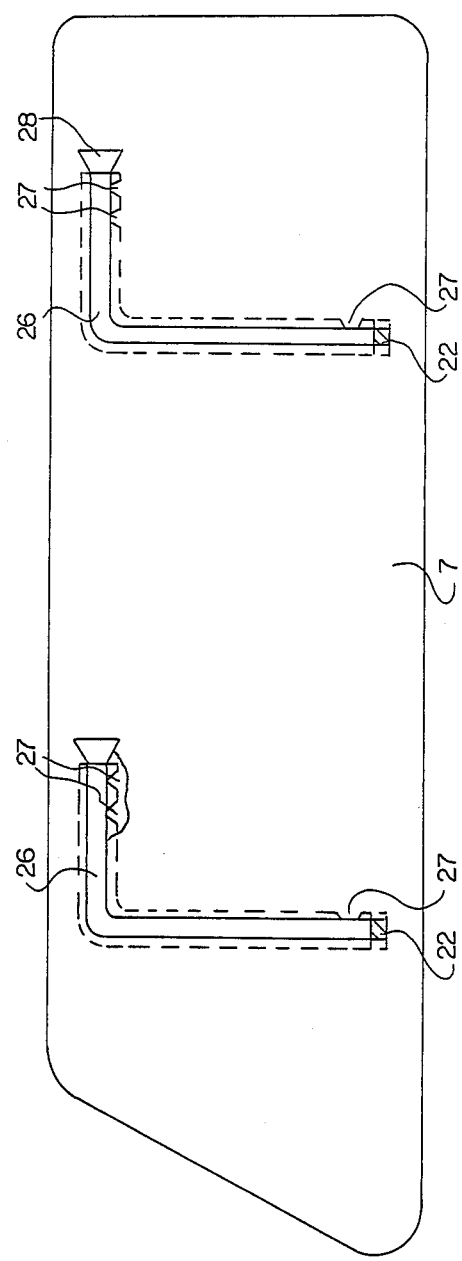
FIG. 6 is an elevational view of yet another embodiment of a sun-visor arrangement.

In the embodiment shown in FIG. 6, two relatively short length slide projections 22 are fastened to the roof frame 9. These slide projections may have the shape shown in FIG. 5a. The sun-visor body 7 is provided on the side thereof facing the side window 15 with two guide paths 26 extending across the sun-visor body, bent at a right angle and undercut. These receive the sliding projections 22, in the manner of a dovetail guide. The vertically extending portion of the guide paths 26 serves for guiding the upward and downward movement of the sun visor body as it is moved between storage and use positions, while the horizontal portion of the guide path 26 serves for the lateral displacement of the sun-visor body 7 when it is in its downward folded position. Projections 27 narrow the guide paths 26 and serve as surmountable stops for holding the sun-visor body 7 in its end positions. For simple placement of the sun-visor body 7 on the slide projections 22, the guide paths 26 are provided at one end with widened entrance bevels 28.

Figure 7:
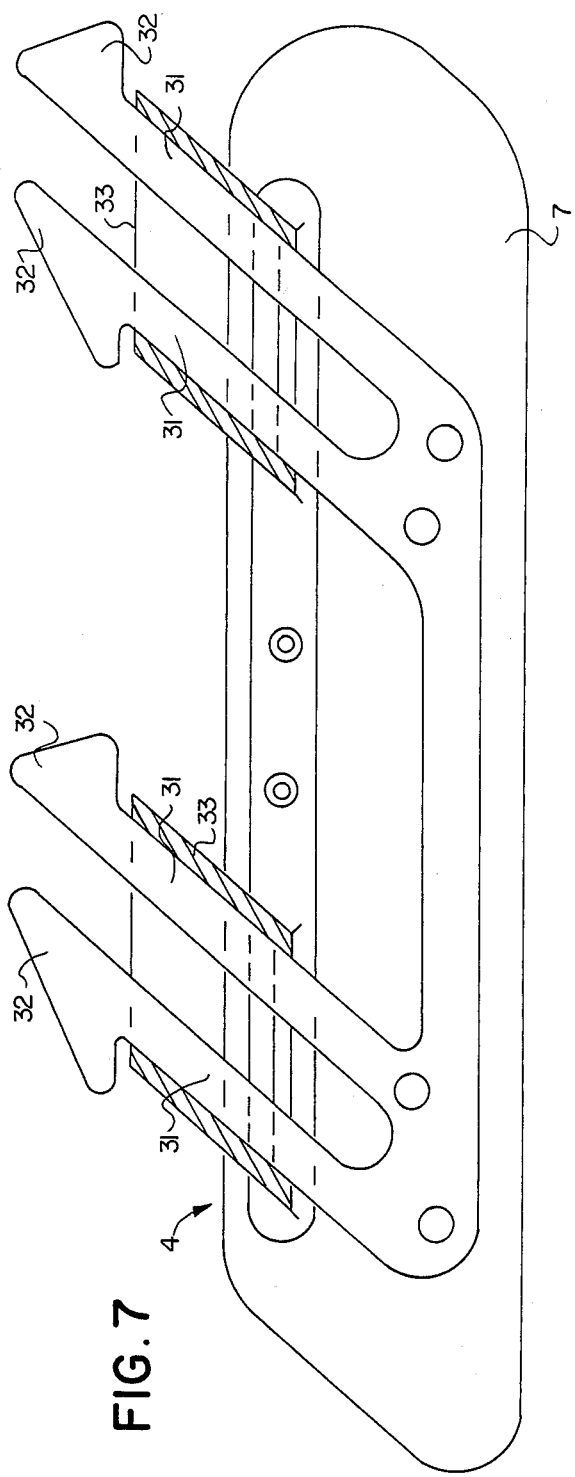
FIG. 7 is an elevational view of still another embodiment of a sun-visor arrangement.
Figure 8:
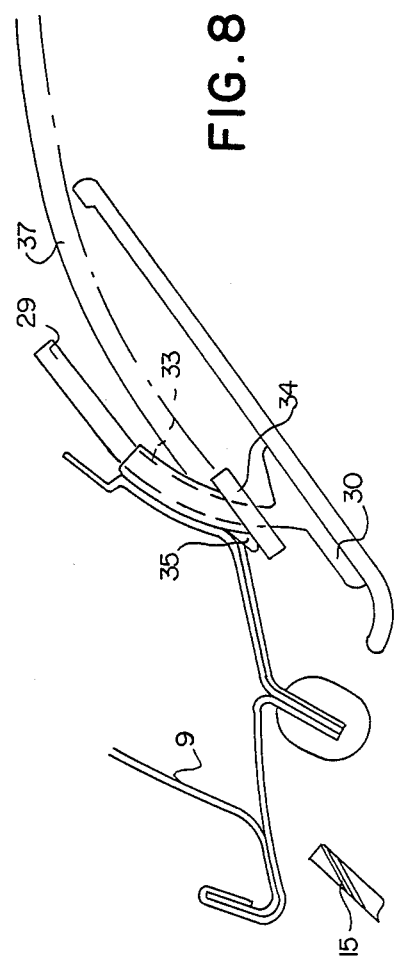
FIG. 8 is a side view of the arrangement of FIG. 7.

The sun visor 4 shown in FIGS. 7 and 8 comprises the sun-visor body 7 which is provided with tenons 29. The tenons 29 are positioned to extend both along and above the side of the sun-visor body 7 facing the side window 15, and they extend over the upper edge of the sun-visor body. The tenons each have a double-armed fork shape. The tenons 29 are connected by a base piece 30 to the sun-visor body 7. The tenons are either separately manufactured and applied to the sun-visor body 7 or else they are formed as a single piece with the sun-visor body 7. The arms 31 of the tenons 29 are provided at their free end regions with outwardly directed, nose-shaped end stops 32. Furthermore, the tenons 29 are comprised of a material of elastic flexibility which makes it possible at least to press the arms 31 of each tenon 29 together without permanent deformation.

The tenons 29 are received in guide tubes 33 which are fastened to the roof ceiling, to the ceiling covering 6 and/or to the roof frame 9. The guide tubes 33 receive the tenons 29 in a displaceable fashion. A frictional force must be overcome for displacement of the tenons, and this force results, for instance, from the arms 31 of the tenon 29 diverging slightly in their initial position, and in their installed condition, they rest under spring tension against the inner walls of the guide tubes 33. As a result, unintended displacement of the sun-visor body 7 is prevented in all positions of the visor body. In addition, or as an alternative, each guide tube 33 can be developed with a projection and the surface of the arm 31 adjacent to that projection would then be developed in the form of a rack. In this way, ratchet-like displacement of the sun-visor body 7 is made possible.

Instead of individual manufacture and installation of the guide tubes 33, which is one alternative, FIG. 7 shows an embodiment in which the guide tubes 33 integrally bear a collar 34. This unit preferably comprises a plastic injection molding. For clip-on installation, the collar 34 is provided with projections 35 having run-in bevels and/or with holes 36 for the passage of fastening screws.

As shown in FIG. 7, in this embodiment, the sun-visor body 7 is displaceable along an oblique path. The end stops 32 form the downward limit on the displacement by coming against the front ends of the guide tubes 33. FIG. 8 shows a suitable arrangement of the tenons 29 behind the roof-frame covering adjoining the ceiling 37. Furthermore, FIG. 8 shows that displacement of the sun-visor body 7 is directed approximately parallel to the side window 15.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. In a vehicle having a windshield visor and a front side window and a sun-visor for said front side window, a mounting arrangement for said front side window sun-visor which mounts said sun-visor above said front side window of said vehicle, said sun-visor having a body which is substantially flat and having a general orientation substantially parallel to said side window, said mounting arrangement including guide means for guiding movement of said visor body up and down with respect to said front side window, without pivoting said visor body out of its orientation substantially parallel to said front side window, said guiding means being also shaped for guiding movement of said visor body along a path which is at least in part lateral with respect to said front side window to cause said front side window visor to move toward and away from said windshield visor.

2. The mounting arrangement of claim 1 wherein said guiding means is also shaped for guiding movement of said visor body for displacement along an oblique path with respect to said side window.

3. The mounting arrangement of claim 1 wherein said guiding means is shaped for guiding movement of said visor body for displacement along a pathway having the shape of an arc and the arc being curved for moving said visor body laterally to cover said side window against glare passing through said side window as said visor body is moved up and down.

4. The mounting arrangement of claim 1, wherein the sun-visor mounting arrangement is additionally adapted for swinging motion.

5. The mounting arrangement of claim 1, wherein the visor body has a side thereof facing the side window of the vehicle; one of the visor body side and a part of the vehicle body facing generally toward that visor body side having an undercut guide groove defined in it; the other of the visor body side and the vehicle body having a slide projection located on engaging the guide groove, whereby the engagement guides movement of the visor body with respect to the vehicle body.

6. The visor body of claim 5, wherein the guide groove is oriented obliquely with respect to the up and down motion of the visor body.

7. The mounting arrangement of claim 5, wherein the guide groove is bent along its length at an angle for changing the direction of movement of the visor body.

8. The visor body of claim 5, wherein the guide groove is arcuately curved with an arc-shape for moving the visor body both up and down and laterally to cover the side window as the visor body moves up and down.

9. The visor body of claim 5, further comprising a friction brake in the guide groove for controlling movement of the visor body.

10. The visor body of claim 9, wherein the friction brake comprises a leaf spring inserted into the guide groove.

11. The sun-visor body of claim 10, wherein the leaf spring includes a detent projection into the guide groove for securing the sun-visor body in a position of non-use.

12. The mounting arrangement of claim 1, further comprising a pair of guide links pivotally connected, at one location along the lengths of the respective links, to the visor body, and at another location along the lengths of the respective links, to the vehicle body, and the links being oriented and pivotally connected to be guided parallel to each other.

13. The mounting arrangement of claim 12, further comprising a guide projection on one of the links; the sun-visor body having a side surface thereof; an arcuate guide path being formed in the side surface of the sun-visor body and the guide projection being engaged in the arcuate guide path and being guided thereby.

14. The mounting arrangement of claim 12, wherein the links are mounted to the sun-visor body through a ball and socket joint therebetween.

15. The mounting arrangement of claim 12, wherein one of the pivot connections of one of the links is developed with friction means for inhibiting free pivoting.

16. The mounting arrangement of claim 12, further comprising a detent spring near the one end of at least one of the links at the vehicle body for inhibiting pivoting of that link for holding the visor body at at least in one end pivot position.

17. The mounting arrangement of claim 1, wherein the guiding means comprises tenons extending upwardly of the visor body and attached thereto and guide tubes fastened to the vehicle body and in which the tenons are displaceably guided, and the tenons and guide tubes being both oriented for guiding the visor body to move between the end positions thereof.

18. The mounting arrangement of claim 17, wherein the tenons have a double-armed fork shape within the guide tubes, and the forks of the tenons engage the interiors of the respective guide tubes.

19. The mounting arrangement of claim 18, wherein the tenons have free end regions which have outwardly directed end stops that block extraction of the tenons from the guide tubes.

20. The mounting arrangement of claim 18, wherein the tenons are comprised of a material of flexural elasticity.

21. The mounting arrangement of claim 18, wherein the tenons are mounted for displacement in ratchet-like fashion within the guide tubes.

22. The mounting arrangement of claim 18, wherein there are two of the tenons spaced apart and attached at one side of the visor body; a respective angularly bent base piece being provided at the one side of the visor body and on which each of the tenons is supported, and the tenons extending from approximately the lower edge of the visor body toward the top edge thereof.

23. The mounting arrangement of claim 17, further comprising a collar to which the guide tubes are integrally mounted and the collar is, in turn, fastened to the vehicle body.

24. The mounting arrangement of claim 23, wherein the collar includes projections defined on it for plug-in installation of the collar to the vehicle body.

25. The mounting arrangement of claim 17, wherein the tenons are integrally formed with the sun-visor body.

26. The mounting arrangement of claim 23, wherein the tenons are integrally formed with the sun-visor body; and the collar and the guide tubes are comprised of an integral plastic injection molding.

27. The mounting arrangement of claim 1, wherein said vehicle also has at least one additional front sun-visor at at least one side of the windshield adjacent said first mentioned sun-visor and wherein said first mentioned sun-visor at said side window and said additional sun-visor may be adjusted when both said sun-visors are down to form a substantially continuous sunlight blocking arrangement from the section of the windshield against the first mentioned visor to said side window.

* * * * *